United States Patent
Hathaway

(10) Patent No.: US 6,352,227 B1
(45) Date of Patent: Mar. 5, 2002

(54) SEGMENTED, BALL JOINTED SUPPORT

(76) Inventor: Clarence Eduard Hathaway, 4800 Bentcreek Dr., Fuquay Varina, NC (US) 27526

(*) Notice: Subject to any disclaimer, the term of this patent is extended or adjusted under 35 U.S.C. 154(b) by 0 days.

(21) Appl. No.: 09/589,843

(22) Filed: Jun. 8, 2000

(51) Int. Cl.$^7$ .................................................. F16M 13/00
(52) U.S. Cl. ........................... 248/160; 403/56; 403/144
(58) Field of Search .............................. 248/160, 278.1, 248/288.31, 288.51, 104; 403/144, 138, 56

(56) References Cited

U.S. PATENT DOCUMENTS

| | | | | |
|---|---|---|---|---|
| 936,379 A | * | 10/1909 | Stevens | 248/160 |
| 1,186,428 A | * | 6/1916 | Newman | 248/276.1 |
| 3,197,552 A | * | 7/1965 | Flair | 174/86 |
| 5,109,321 A | * | 4/1992 | Maglica et al. | 248/288.31 X |
| 5,921,694 A | * | 7/1999 | Herbermann | 403/56 |

* cited by examiner

Primary Examiner—Ramon O. Ramirez

(57) ABSTRACT

A segmented, ball jointed support, which is an improvement over other support devices which make use of ball joints to provide universal flexibility of the support. This support is made up of a plurality of individual hollow segments, each segment shaft having a male ball at one end that is received by an adjacent segment's female socket. The socket is sized to fit snugly over the received ball. A spring-detent arrangement within the segment shaft acts against a receiving hole at the top of the corresponding ball. The spring-detent allows the ball joint to be "snap returned" to a straight, axially aligned arrangement. The spring-detent also provides greater joint stability over a longer length of assembled support, without compromising useful flexibility of the support. A radial compression device around the segment socket maintains appropriate joint tightness and compensates for joint wear. The segment shafts are manufactured of varied lengths to accommodate differing flexibility needs of the assembled support, depending on its intended use. The support can be free standing or made part of, or integrated into another system.

15 Claims, 1 Drawing Sheet

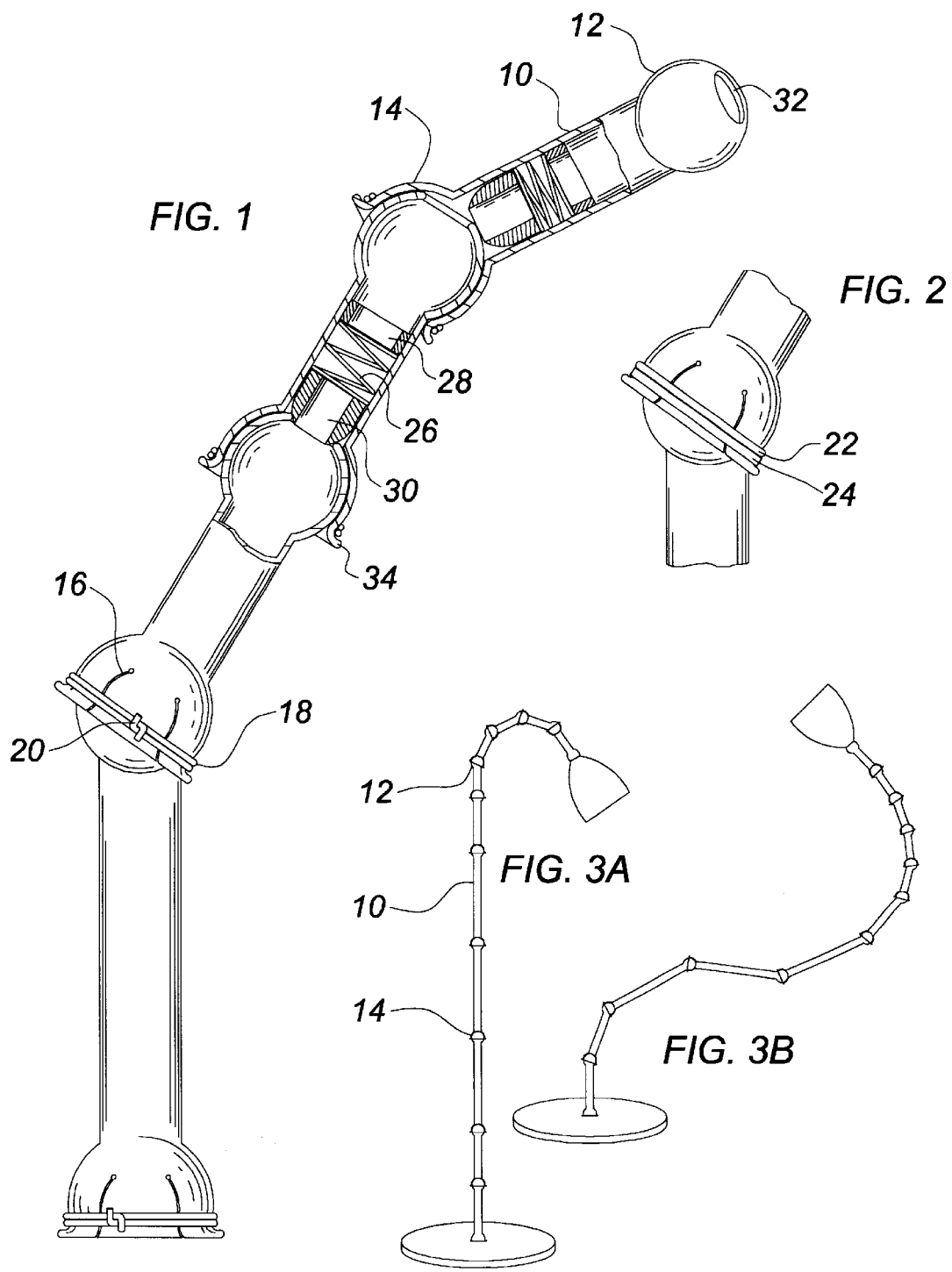

SEGMENTED, BALL JOINTED SUPPORT

BACKGROUND—FIELD OF INVENTION

This invention relates to flexible support stands or posts which are typically used for supporting items such as lamps, tools, microphones, cameras, faucets or other items. In the past, flexible supports have been limited in length due to the weight of the item being supported and the weight of the support itself causing the joints of the support to lose the position in which they were set. Such loss of joint positioning results in drooping of the support and of the item supported. Another limitation of previous flexible supports is the inability of the support to be easily returned to a position where all segments in the flexible support form a straight line. The present invention provides a multi-segmented flexible support that overcomes these limitations.

BACKGROUND—DISCUSSION OF PRIOR ART

Flexible supports for lamps or other lightweight tools have typically been constructed of either a semi-rigid shaft that allows for bending and positioning of the supported item, or of a series of variously styled joints that result in an effective flexibility of a series of rigid segments. Early inventors made use of swiveled ball joints to achieve a universal range of lamp or tool positioning. U.S. Pat. No. 1,186,428 to Newman (1916) described a lamp bracket using a series of ball and socket joints to allow flexible positioning of the lamp. Its externally routed power cord would have exposed the wire to possible damage during use, however, this idea does effectively illustrate the basic approach built upon by a number of similar, subsequent ideas.

In U.S. Pat. No. 936,379 to Stevens (1909), the approach to routing the lamp's power cord through the center axis of the flexible support is disclosed. In this idea, a "ball" and "thimble" bracket arrangement provides flexibility of the support. An additional useful aspect of this idea is the use of a tension spring which runs along the length of the support's hollow interior and keeps the system stiffer, yet still flexible. However, the overall useful length of this device is limited in part by the balance between the tensioning spring's effect on joint tightness versus the loading placed on the device by the supported lamp, as well as that of its own weight.

U.S. Pat. No. 1,279,803 to Watson (1918), describes a similar axial spring-tensioned support. This device uses ball and cone-shaped segments of gradually decreasing size with proximity to the lamp end of the support. The decreasing size, and therefore decreasing weight, of the support's segments allows for greater useful length, however the support length is still limited in part by the balance between the tensioning spring's joint stiffening effect and the loading imposed by the supported lamp.

More recent approaches to flexible tool or lamp supports make use of conjoined multiple ball and socket segments. U.S. Pat. No. 5,398,176 to Ahuja (1995) and U.S. Pat. No. 5,521,803 to Eckert, et al. (1996) both use ball and socket joints that rely on a friction fit to maintain joint stability. As with previous similar devices, the overall useful length of the support is limited due to reliance solely on this friction fit of the joint. Also, none of the other devices referenced have a means to quickly and easily return the support to a true axially straight alignment following use.

SUMMARY

The present invention provides an improved, flexible support assembly comprised of a series of ball and socket jointed segments. The ball of one segment fits into the socket of a conjoining segment and the resulting joint is held in place by friction that comes from three different sources. The first source comes from the ball and socket themselves. In their working positions the outer surface of the ball and the inner surface of the socket provide a source of friction. Secondly, a radial compression device around the socket creates more friction between the ball and socket. The radial compression device can be set to provide varying degrees of friction, within the same support, based on the requirements of the item being supported. Further, the radial compression device automatically adjusts to compensate for lost friction in the joint due to normal wear that occurs over time. Finally, a spring loaded detent plunger in the shaft of each segment pushes against the ball of a conjoining segment thereby creating the third source of friction. When the support assembly is bent into a desired shape by the user the shape is maintained in the present invention without drooping. This is made possible by the three sources of friction acting on the ball and socket in each joint.

After any two segments have been flexed at their associated joint, the segments can be quickly and easily snapped back into a true axially straight alignment. This is accomplished through the use the spring loaded internal plunger detent mechanism which forces a plunger, located toward the socket end of each segment, partially into a hole that is in the top of each ball when the segments are flexed back toward an axially straight alignment.

OBJECTS AND ADVANTAGES

Accordingly, several objects and advantages of my invention are:

(a) to provide a flexible support for lamps, tools or other items, such as a microphone, camera or faucet, that the user can universally position to a variety of useful orientations, yet be quickly and easily returned to an axially straight configuration after use;

(b) to provide a flexible support for lamps, tools or other items that is designed to be manufactured with various segment lengths to allow for differing effective bend radius needs, depending on the end use of the support;

(c) to provide a flexible support with the option of being manufactured with varied radial compression device tensions on each segment socket, depending on the intended load that the support, or individual support segment, will carry; and (d) to provide a flexible segmented support assembly of greater useful length than previous flexible supports.

BRIEF DESCRIPTION OF THE DRAWINGS

The invention will now be described in more detail with reference to the preferred embodiment of the apparatus and method, given only by way of example, and with reference to the accompanying drawings, in which:

FIG. 1 is a perspective view, partially in section, illustrating a series of varied-length joined segments;

FIG. 2 is a perspective view illustrating an alternate embodiment of the radial compression device using an elastic material rather than spring metal; and FIGS. 3A and 3B are reduced perspective views which illustrate a possible use of the present support as a free-standing floor lamppost, in two different configurations.

| Reference Numerals In Drawings |
| --- |
| 10 shaft |
| 12 ball |
| 14 socket |
| 16 relief cut |
| 18 radial compression device |
| 20 radial expansion limiting hooks |
| 22 elastic radial compression band |
| 24 radial expansion limiting ring |
| 26 detent spring |
| 28 spring stop ring |
| 30 detent plunger |
| 32 detent hole |
| 34 ledge |

DETAILED DESCRIPTION OF THE INVENTION

Each support segments as illustrated in FIG. 1 includes a tubular segment shaft 10, a segment ball 12, and a segment socket 14. In the preferred embodiment, the segments are molded or machined of a rigid, relatively lightweight plastic such as polyvinyl chloride or polyethylene. Alternately, the segments could be formed from a cast, spun, or machined lightweight metal such as aluminum. Shaft 10 can be provided in differing lengths, within the same assembly, depending on the end use of the support. Further, the entire support assembly can be made decorative so as to provide an aesthetically pleasing appearance. Decoration of the support may be by manufacturing the segments of a colorful material or by covering the support assembly with a decorative material after the manufacturing process.

Socket 14 of each segment shaft 10 has a spherically curved inner surface adapted for receipt of spherically curved ball 12 of an adjacent segment. The close tolerance between the sizes of these two surfaces is such that ball 12 is primarily held in place in a conjoining socket 14 by a friction fit. A series of longitudinal relief cuts 16 placed around the perimeter of socket 14 allow for greater flexibility of socket 14. The radial compression device 18 works in conjunction with these longitudinal relief cuts 16 to provide for more intimate contact, and consistent joint friction between ball 12 and socket 14. Radial compression device 18 can be provided with varying tensions depending on the end use of the support. The variety of tensions provided by compression device 18 can be within the same support assembly or entire support assemblies can be provided with each offering a different tension option.

In the preferred embodiment, the radial compression device 18 is made of a spring material wound peripherally on a ledge 34 at the axial end of socket 14. Socket ledge 34 is located below the equator of socket 14 on a plane perpendicular to the axis of the segment shaft 10. Ledge 34 is positioned sufficiently below the equator of socket 14 to allow its associated radial compression device 18 to develop an adequate grip on a conjoined segment ball 12. However, it should not be positioned so far below the equator of socket 14 as to unnecessarily limit the range of angular displacement of the joint. Over the useful life of the assembly the radial compression device 18 will adjust for normal wear of ball 12 and socket 14 mating surfaces. This adjustment allows the present support to be used over and over again without loosing its ability to support relatively heavy items. In the absence of this radial compression device 18, this normal joint wear could result in excessive loosening of the joint over time.

Radial compression device 18 also includes associated radial expansion limiting hooks 20. These radial expansion limiting hooks 20 are an integral part of the radial compression device 18, and are provided by shaping the ends of the radial compression device 18 into interlocking hooks 20. These hooks 20 are positioned to allow constant inward radial tension of the spring on socket 14, but limit outward radial expansion of socket 14 by interlocking as socket 14 flexes radially outward. Excessive outward radial flexing of socket 14 could overcome the combined inward radial tension of socket 14 and radial compression device 18 and cause separation of the segment joint(s). This condition might be caused by an excessive induced axial tension on the support assembly or individual segment joint, or from an excessive induced over extension of a given joint beyond the point of interference between socket ledge 34 with a corresponding segment shaft 10.

Detent spring 26 is a compression spring mounted coaxially within each segment shaft 10, generally located toward the segment socket 14. The outer diameter of the detent spring 26 is slightly smaller than the inner diameter of the segment shaft 10 to allow free action of the spring without excessive play. A spring stop ring 28 is attached to the inner surface of the segment shaft 10 and provides an anchored base for one axial end of the detent spring 26. The spring stop ring 28 is attached at a suitable location to provide appropriate pre-load of the detent spring 26. The detent spring 26 is positioned to provide axial thrust against a tubular detent plunger 30. When the detent plunger 30 engages a detent hole 32 at the axial end of a conjoining segment ball 12 the two segments will be in a straight alignment. When plunger 30 is not engaged within hole 32, plunger 30 provides friction against ball 12 thereby adding to the friction that hold the joint in a desired shape. The inside diameter of the detent hole 32 is slightly smaller than outside diameter of the detent plunger 30 to provide positive capture of the rounded tip of the detent plunger 30 when the alignment of two conjoining segments is adjusted to approach an axially straight configuration. The action of the detent plunger 30 provides a "snap action" bias of the joint toward an axially straight alignment between conjoining segments. This allows the support to be quickly and easily snapped back to a straight configuration.

Both the diameter of the detent hole 32 and the inner diameter of the tubular detent plunger 30 are sized to allow for a continuous aperture to exist throughout the segmented support, even at maximum angular deflection of the segment joints. This aperture serves as a conduit for any desired electrical or fluid conductors through the support. Such conductor could be an electrical cord, for example, that plugs into an electrical outlet at one end and powers a light or tool, for example, at the other end. The conduit could also be used to provide passage of a tube that carries air, fuel, oil or water, for example. In this case, the support could have a faucet type dispensing apparatus at the terminal end of the support and the base end of the support could be integrated into fluid system.

FIG. 2 illustrates an alternative embodiment in which the radial compression device, radial compression band 22, is composed of an elastic material such as silicone or natural rubber. This embodiment also includes an associated metal or rigid plastic radial expansion limiting ring 24. Radial compression band 22 can be of varying tensions depending on the end use of the support. Compression bands of varying tensions could also be provided within the same support assembly. Of course the radial compression device can be made of any material, with the only requirement being the ability to maintain, or adjustably maintain, a selected tension around socket 14.

In FIGS. 3A and 3B, two exemplary configurations of the support is set up as a freestanding floor lamppost are shown. In FIG. 3A, the flexible support is set up as a reading lamp. In FIG. 3B, the support is set up as a work light, illuminating the underside of the work area. These figures also illustrate the use of different segment lengths used at different portions of the support as necessary for appropriate bend radius. A support post can be made up of any number of segments, as determined by the end use of the assembly. Generally, portions of the support that require greater flexibility will be made of shorter segments and conversely, portions of the support that require less flexibility will be made with longer segments.

The lamp support shown in FIGS. 3A and 3B has a base at one end and an attachment device at the other end so as to hold the lamp in place. The electrical cord runs through the center of the hollow support so that the cord is protected, hidden and does not dangle from the lamp. The lamp support of FIGS. 3A and 3B is shown for exemplary purposes only. The present invention is intended to provide flexible secure support for any item that requires such support. Other items that may by supported by the present invention include tools, drills, cameras, microphones, sensors, mirrors and faucets that dispense fluids such as air, fuel, oil or water, for example. The base and the attachment device which are at opposite ends of the present support can be adapted so as to meet the needs of the item being supported. Further, if the present support is integrated into a fluid system, for example, or other system that would not require the support to be free standing then a base would not be needed.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A support assembly having a plurality of tubular segments, each segment comprising:
   a shaft extending along a central axis;
   a hollow male ball portion at one end of said shaft;
   a hollow female socket portion at the other end of said shaft;
   wherein, said male ball portion is adapted for frictional embracement by a female socket portion of another tubular segment thereby forming a joint; and
   said shaft contains a compression spring-loaded detent plunger mechanism that provides a positive positioning bias of said support assembly toward a true axially straight alignment.

2. The support assembly of claim 1, wherein said detent plunger mechanism provides rigidity to said support assembly when said support assembly is in an axially straight alignment thus extending the useful length of said support assembly.

3. The support assembly of claim 1, wherein the frictional embracement of said female socket is augmented by an adjustable radial compression device that provides for a tighter embracement and compensates for frictional losses due to wear of said joint from use; and
   wherein longitudinal relief cuts are provided in the female socket portion so as to work in conjunction with the radial compression device.

4. The support assembly of claim 3, wherein said radial compression device has varying tensions to accommodate differing end use loads on said support assembly.

5. The support assembly of claim 1, wherein said shafts are in varying lengths so as to provide a variety of effective bending radiuses of said support assembly as required by the end use of said assembly.

6. The support assembly of claim 1, wherein the assembly is made decorative either during or after manufacture.

7. A flexible segmented support for holding an item such as a light, a tool, made of multiple hollow segments, each segment comprising:
   a male end with a hole therein;
   a female end for frictionally accepting said male end and thereby forming a joint; and
   a shaft that connects the male end to the female end wherein, the shaft includes a detent plunger mechanism located at the female end of the shaft, the plunger mechanism being able to engage the hole of a conjoining male segment.

8. The segmented support of claim 7, wherein the female end comprises a radial compression device for increasing and maintaining the friction within the joint.

9. The segmented support of claim 8, wherein:
   tension created by the radial compression device is adjustable; and
   the female end includes longitudinal cuts that assist in adjusting the tension.

10. The segmented support of claim 7, wherein each segment has the ability to non-permanently snap to center so as to form a straight alignment of segments.

11. The segmented support of claim 7, wherein the hollow segments have varying lengths and provide for passage of an electrical cord or liquid conduit even when the segments are bent to their maximum position.

12. A method of providing a support for an item, such as a lamp or tool, with a flexible hollow segmented support, the method comprising the steps of:
   joining one or more hollow segments together to form a joint, each segment having a male end, a female end, and a shaft connecting the male and the female ends, wherein the male end of one segment is frictionally embraced by the female end of a second segment;
   providing a radial compression device around the outside of the female ends so that additional friction is adjustably added to the friction in the joint; and
   providing a detent plunger mechanism in each shaft so that a spring loaded plunger in the female end non-permanently engages a hole in the male end when the segments are brought toward an axially straight alignment.

13. The method of claim 12, wherein the hollow segments are provided in varying lengths.

14. The method of claim 12, further comprising the steps of:
   providing a base at one end of the support, so that the support may be free standing; and,
   providing an attachment device such as a clasp at the opposite end of the support so as to hold the item.

15. The method of claim 12, further comprising the step of:
   making the support decorative either during or after manufacture.

* * * * *